(12) United States Patent
Kuroki (10) Patent No.: US 9,294,664 B2
(45) Date of Patent: Mar. 22, 2016

(54) IMAGE DISPLAY APPARATUS THAT DISPLAYS A MENU CORRESPONDING TO AN OBJECT, IMAGE DISPLAY METHOD THAT DISPLAYS A MENU CORRESPONDING TO AN OBJECT, AND STORAGE MEDIUM THEREOF

(71) Applicant: CANON KABUSHIKI KAISHA, Tokyo (JP)

(72) Inventor: Tsuyoshi Kuroki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 13/741,590

(22) Filed: Jan. 15, 2013

(65) Prior Publication Data

US 2013/0182129 A1    Jul. 18, 2013

(30) Foreign Application Priority Data

Jan. 18, 2012 (JP) ................................ 2012-008288

(51) Int. Cl.
    *H04N 5/225*    (2006.01)
    *H04N 5/228*    (2006.01)
    *H04N 5/232*    (2006.01)
(52) U.S. Cl.
    CPC .......... *H04N 5/232* (2013.01); *H04N 5/23293* (2013.01)
(58) Field of Classification Search
    CPC ................................................. H04N 5/23245
    USPC ................................ 348/231.99, 232, 333.01
    See application file for complete search history.

(56) References Cited

U.S. PATENT DOCUMENTS

| 2005/0122405 A1* | 6/2005 | Voss et al. ................... 348/211.2 |
| 2009/0073285 A1* | 3/2009 | Terashima ............... 348/231.99 |
| 2010/0134265 A1* | 6/2010 | Lin et al. ........................ 340/436 |
| 2012/0013783 A1* | 1/2012 | Asami ...................... 348/333.02 |
| 2012/0057032 A1* | 3/2012 | Jang et al. .................. 348/207.1 |

FOREIGN PATENT DOCUMENTS

| JP | 2007-208757 A | 8/2007 |
| JP | 2009-017540 A | 1/2009 |
| JP | 2011-211621 A | 10/2011 |

OTHER PUBLICATIONS

Keiji Yanai, "The Current State and Future Directions on Generic Object Recognition", vol. 48, No. SIG 16(CVIM 19), Nov. 2007.
Paul Viola, Michael Jones, "Rapid Object Detection Using a Boosted Cascade of Simple Features", Accepted Conference on Computer Vision and Pattern Recognition 2001.
Navneet Dalal, Bill Triggs, "Histograms of Oriented Gradients for Human Detection", "International Conference on Computer Vision & Pattern Recognition (CVPR '05) 1 (2005) 886-893" DOI : 10.1109/CVPR.2005.177.
Andrew Rabinovich, et al.,"Objects in Context", Proceedings of the 2007 IEEE International Conference on Computer Vision, 2007.

* cited by examiner

*Primary Examiner* — Joel Fosselman
(74) *Attorney, Agent, or Firm* — Canon U.S.A., Inc., IP Division (57) ABSTRACT

An image display apparatus configured to recognize one or more objects from an image, determine a display priority of a menu to be displayed relating to a recognized object based on a set display mode, and displaying menus corresponding to one or more recognized objects based on the determined display priority.

14 Claims, 12 Drawing Sheets

SCENERY PRIORITY REPRODUCTION MODE

| TARGET OBJECT | IMPORTANCE k |
|---|---|
| REGISTERED PERSON | 0 |
| UNREGISTERED PERSON | 0 |
| CHARACTER | 0 |
| DOG AND CAT | 0 |
| DOMESTIC ANIMAL | 0 |
| OTHER ANIMALS | 0 |
| FARAWAY MOUNTAIN | 100 |
| FOREST | 30 |
| GREEN SPACE | 30 |
| FALL, RIVER, AND POND | 100 |
| BUILDING | 10 |
| ROAD | 10 |
| SEA | 0 |
| SKY | 0 |
| ... | ... |

FIG. 5A
NORMAL REPRODUCTION MODE

| TARGET OBJECT | IMPORTANCE k |
|---|---|
| REGISTERED PERSON | 100 |
| UNREGISTERED PERSON | 50 |
| CHARACTER | 30 |
| DOG AND CAT | 10 |
| DOMESTIC ANIMAL | 10 |
| OTHER ANIMALS | 30 |
| FARAWAY MOUNTAIN | 20 |
| FOREST | 10 |
| GREEN SPACE | 10 |
| FALL, RIVER, AND POND | 20 |
| BUILDING | 10 |
| ROAD | 10 |
| SEA | 10 |
| SKY | 10 |
| ... | ... |

FIG. 5B
SCENERY PRIORITY REPRODUCTION MODE

| TARGET OBJECT | IMPORTANCE k |
|---|---|
| REGISTERED PERSON | 0 |
| UNREGISTERED PERSON | 0 |
| CHARACTER | 0 |
| DOG AND CAT | 0 |
| DOMESTIC ANIMAL | 0 |
| OTHER ANIMALS | 0 |
| FARAWAY MOUNTAIN | 100 |
| FOREST | 30 |
| GREEN SPACE | 30 |
| FALL, RIVER, AND POND | 100 |
| BUILDING | 10 |
| ROAD | 10 |
| SEA | 0 |
| SKY | 0 |
| ... | ... |

FIG. 5C
CHARACTER PRIORITY REPRODUCTION MODE

| TARGET OBJECT | IMPORTANCE k |
|---|---|
| REGISTERED PERSON | 0 |
| UNREGISTERED PERSON | 0 |
| CHARACTER | 100 |
| DOG AND CAT | 0 |
| DOMESTIC ANIMAL | 0 |
| OTHER ANIMALS | 0 |
| FARAWAY MOUNTAIN | 0 |
| FOREST | 0 |
| GREEN SPACE | 0 |
| FALL, RIVER, AND POND | 0 |
| BUILDING | 0 |
| ROAD | 0 |
| SEA | 0 |
| SKY | 0 |
| ... | ... |

NORMAL REPRODUCTION MODE

| TARGET OBJECT | MENU ITEM 1 | MENU ITEM 2 | MENU ITEM 3 |
|---|---|---|---|
| REGISTERED PERSON | TRANSMIT IMAGE | ADD TO TRANSMISSION LIST | VIEW THE OTHER IMAGES |
| UNREGISTERED PERSON | REGISTER NAME | VIEW THE OTHER IMAGES | |
| CHARACTER | DISPLAY SEARCH RESULT | | |
| DOG AND CAT | CALL CRY | | |
| DOMESTIC ANIMAL | CALL CRY | | |
| OTHER ANIMALS | CALL CRY | | |
| FARAWAY MOUNTAIN | DISPLAY MAP | | |
| FOREST | DISPLAY MAP | | |
| GREEN SPACE | DISPLAY MAP | | |
| FALL, RIVER, AND POND | DISPLAY MAP | | |
| BUILDING | DISPLAY MAP | | |
| ROAD | DISPLAY MAP | | |
| SEA | | | |
| SKY | | | |
| ... | ... | | |

FIG. 10

| TARGET OBJECT \ POSITION INFORMATION | UNACQUIRED (INDOORS) | AROUND USER'S RESIDENCE | SPOT AWAY FROM USER'S RESIDENCE |
|---|---|---|---|
| REGISTERED PERSON | NORMAL REPRODUCTION MODE | NORMAL REPRODUCTION MODE | NORMAL REPRODUCTION MODE |
| UNREGISTERED PERSON | NORMAL REPRODUCTION MODE | NORMAL REPRODUCTION MODE | SCENERY PRIORITY REPRODUCTION MODE |
| NO PERSON | NORMAL REPRODUCTION MODE | SCENERY PRIORITY REPRODUCTION MODE | SCENERY PRIORITY REPRODUCTION MODE |
| CHARACTER | SCENERY PRIORITY REPRODUCTION MODE | SCENERY PRIORITY REPRODUCTION MODE | SCENERY PRIORITY REPRODUCTION MODE |

IMAGE DISPLAY APPARATUS THAT DISPLAYS A MENU CORRESPONDING TO AN OBJECT, IMAGE DISPLAY METHOD THAT DISPLAYS A MENU CORRESPONDING TO AN OBJECT, AND STORAGE MEDIUM THEREOF

BACKGROUND OF THE INVENTION

1. Field of the Invention

Aspects of the present invention generally relate to an image display apparatus, an image display method, and a storage medium.

2. Description of the Related Art

As discussed in Non-Patent Document 1 (The Current State and Future Directions on Generic Object Recognition (Keiji Yanai, IPSJ Journal: Computer Vision and Image Media, Vol. 48, November 2007)), a technique called as generic object recognition has been vigorously studied lately. By applying the generic object recognition technique to an image, a human face, a human body, plants, dishes, buildings, and animals captured in an image can be recognized and names thereof can be obtained therefrom.

On the other hand, a digital camera, a mobile phone with a camera, and a digital photo frame can display time when the image was captured and can send the image by e-mail according to an additional operation by a user when the captured image is displayed.

In the current digital camera, mobile phone with a camera, and digital photo frame, in a case where the user provides an operation to the captured image, in many cases, the user designates the entire image and thereafter inputs a command to the image from a menu. For example, in a case where the user views the captured images one by one and wishes to send the image by e-mail, the user selects an e-mail sending command from a menu screen at the time and thereafter designates an e-mail address to which the user wishes to send the e-mail.

However, it has been impossible to suitably apply the generic object recognition technique to an imaging device such as a digital camera to date. Further, there has been such a problem that the user have to designate operations to the image every time in detail in, for example, the digital camera.

SUMMARY OF THE INVENTION

An aspect of the present invention relates to an image display apparatus including a recognition unit configured to recognize at least one object from an image, a determination unit configured to determine a display priority of a menu to be displayed relating to an object recognized by the recognition unit based on a set display mode, and a display unit configured to display a menu corresponding to the object recognized by the recognition unit based on the display priority determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An imaging apparatus according to the present exemplary embodiment is a compact digital camera capable of displaying a captured image. The imaging apparatus according to the present exemplary embodiment recognizes a captured subject by an image recognition technique and combines a menu suitable for the captured subject to display the resulting image when the imaging apparatus displays the captured image.

Figure 1:
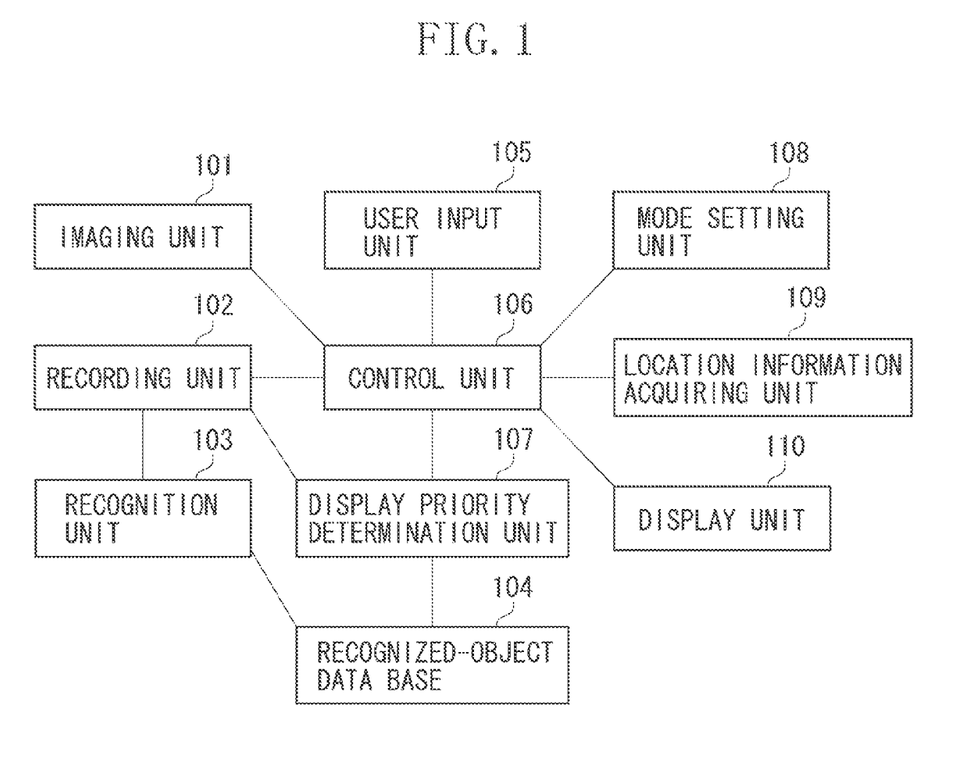
FIG. 1 is a block diagram illustrating an example of a configuration of an imaging apparatus.

FIG. 1 illustrates an example of a configuration of an imaging apparatus according to the present exemplary embodiment. A configuration of the imaging apparatus according to the present exemplary embodiment is described below with reference to the drawings attached hereto.

An imaging unit 101 inputs a captured image. The imaging unit 101 inputs an image captured by an imaging apparatus which includes, for example, a charge-coupled device (CCD) camera module and a complementary metal-oxide semiconductor (CMOS) camera module. The imaging unit 101 outputs an image signal to a control unit 106. The output image signal is converted into an image file by the control unit 106 to be stored in a recording unit 102.

The recording unit 102 stores image files output from the control unit 106. The recording unit 102 may include any medium as far as the medium can store digital data. In the present exemplary embodiment, the recording unit 102 includes a Secure Digital (SD) card.

A recognition unit 103 recognizes an image. Recognition of the recognition unit 103 can be realized in such a manner that a micro processing unit built in the imaging apparatus executes a program. How the recognition unit 103 operates is described below.

A recognized-object database 104 stores information relating to an object or a land form which the recognition unit 103 can recognize. The recognized-object database 104 stores a target object importance table indicating the importance of each target object which the recognition unit 103 can recognize in each display mode.

The recognized-object data base 104 stores face identification information used in the following process of personal identification performed referring to a face. The recognized-object data base 104 stores name information of a face when the name of the face has been registered by the user.

The recognized-object data base 104 further stores a map data base. The recognized-object data base 104 still further stores the below described target object-related submenu table.

The recognized-object data base 104 may include any medium as far as the medium can store digital data. In the present exemplary embodiment, digital data is recorded in a built-in flash memory.

A user input unit 105 receives an input of an operation of the user. The user input unit 105 inputs the operation of the user to the input device including buttons (e.g., a shutter button and a zoom button) relating to image capturing and a touch panel attached over a display unit 110 of the imaging apparatus.

A control unit 106 controls various operations of the imaging apparatus. The control of the control unit 106 is realized in such a manner that the micro processing unit built in the imaging apparatus executes a program.

A display priority determination unit 107 determines priority as to which object a menu is to be displayed among the target objects recognized on an image. Determination of the display priority determination unit 107 is realized in such a manner that the micro processing unit built in the imaging apparatus executes a program.

A mode setting unit 108 receives a user operation as to switching of the operation modes of the imaging apparatus. In the present exemplary embodiment, the imaging apparatus is operated in four operation modes such as an "image capturing mode", a "normal reproduction mode", a "scenery priority reproduction mode", and a "character priority reproduction mode". The mode setting unit 108 includes a mode setting dial attached to the imaging apparatus.

A location information acquiring unit 109 acquires information as to where the imaging apparatus is positioned on the earth and as to which direction the imaging apparatus is oriented. The location information acquiring unit 109 includes a Global Positioning System (GPS) module built in the imaging apparatus and an orientation measuring module including a magnetic field sensor and an acceleration sensor.

A display unit 110 controls a display of a captured image and a menu corresponding to the captured image. The display unit 110 performs control to display a captured image on a display apparatus including, for example, a liquid crystal display. Since a transparent touch panel including the user input unit 105 is disposed over the liquid crystal display, the user can perform a one-touch operation directly to the target object displayed on the touch panel.

The configuration of the imaging apparatus according to the present exemplary embodiment has been described above with reference to the drawings attached hereto.

An operation of the imaging apparatus according to the present exemplary embodiment is described below. The imaging apparatus according to the present exemplary embodiment mainly performs image capturing and image display. A description of the image capturing is omitted here since the imaging apparatus according to the present exemplary embodiment performs an operation similar to an operation of a general compact type digital camera. Since an operation of the image display for displaying the captured image differs from that of the general compact type digital camera, a description of the image capturing is made below.

Figure 2:
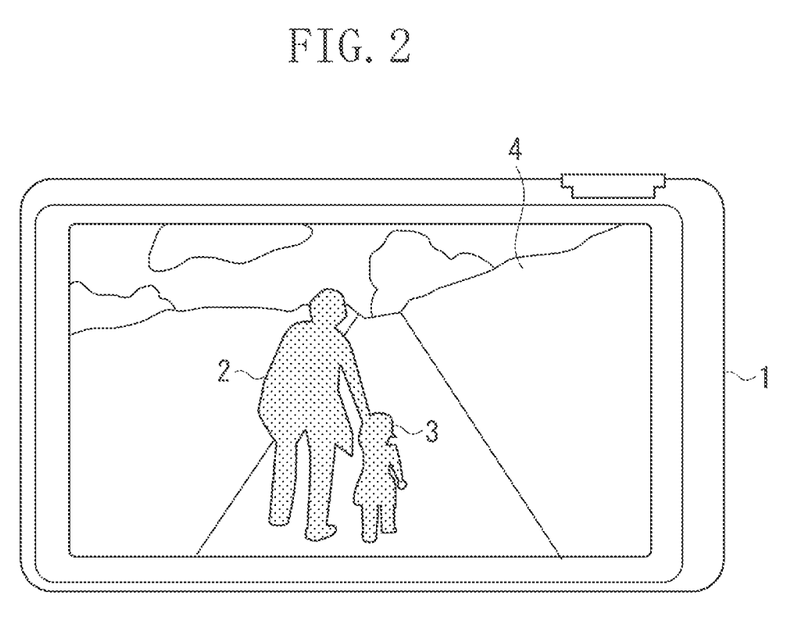
FIG. 2 illustrates an example of an image captured by the imaging apparatus.

FIG. 2 illustrates an example of an image captured by the imaging apparatus according to the present exemplary embodiment. In FIG. 2, the imaging apparatus 1 captures an image including a person 2, a child 3, and scenery 4.

Figure 3:
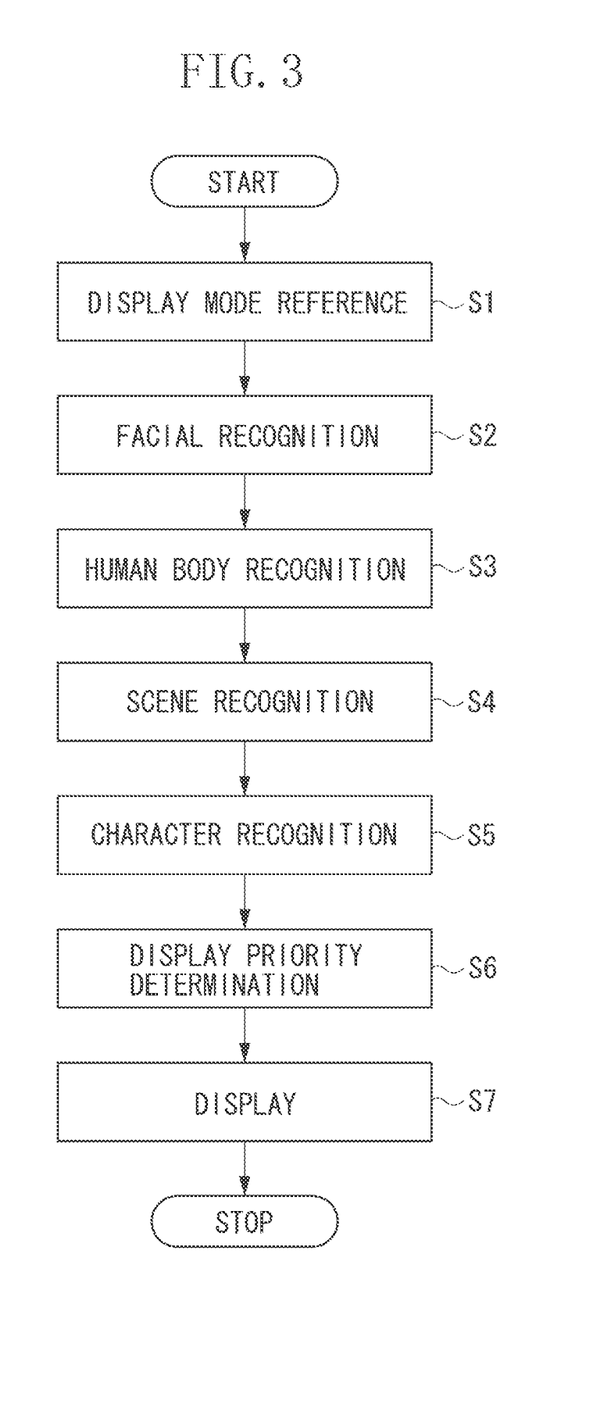
FIG. 3 is a flow chart illustrating processing performed in a display operation of the imaging apparatus.

FIG. 3 is a flow chart illustrating processing of a display operation of the imaging apparatus according to the present exemplary embodiment. The processing of the display operation of the imaging apparatus is described below with reference to the drawings.

When the user selects an operation mode from any one of the "normal reproduction mode", the "scenery priority reproduction mode", the "character priority reproduction mode" in the mode setting unit 108, processing illustrated in FIG. 3 is started in such a manner that the micro processing unit built in the imaging apparatus executes a program.

In step S1 (display mode reference step), the control unit 106 refers to the mode setting unit 108 to confirm which mode the user has selected from the modes of the "normal reproduction mode", the "scenery priority reproduction mode", and the "character priority reproduction mode".

In step S2 (facial recognition step), the recognition unit 103 executes facial recognition processing.

Firstly, one or more faces in the image are detected. The detection is similar to that performed by the general compact type digital camera. For example, the detection may be performed by using a Viola-Jones face detector discussed in Non-Patent Document 2 (Rapid Object Detection Using a Boosted Cascade of Simple Features, Proceedings of the 2001 IEEE Computer Society Conference on Computer Vision and Pattern Recognition, 2001).

Then, after the face recognition, a personal identification is performed. In the personal identification processing, the detected face is compared with face identification information recorded in the recognized-object data base 104 to be determined whether the detected face corresponds to a registered person. The personal identification may be performed by any method as far as the method can determine whether the person captured in the image corresponds to the person registered in the recognized-object data base 104.

The personal identification is performed, for example, by a method in which various kinds of features such as an edge orientation and a local texture are extracted from a face image and subsequently a feature vector is projected onto a feature space to compare distances between vectors within the feature space to perform the determination.

In step S3 (human body recognition step), the recognition unit 103 executes human body recognition processing.

Firstly, one or more human bodies in the image are detected. The human body detection may be performed by any method as far as the method can detect a person from the image. For example, the method can perform processing utilizing histograms of oriented gradients (HOG) feature quantity discussed in, for example, Non-Patent Document 3 (Histograms of Oriented Gradients for Human Detection, Proceedings of the 2005 IEEE Computer Society Conference on Computer Vision and Pattern Recognition, 2005).

Figure 4A:
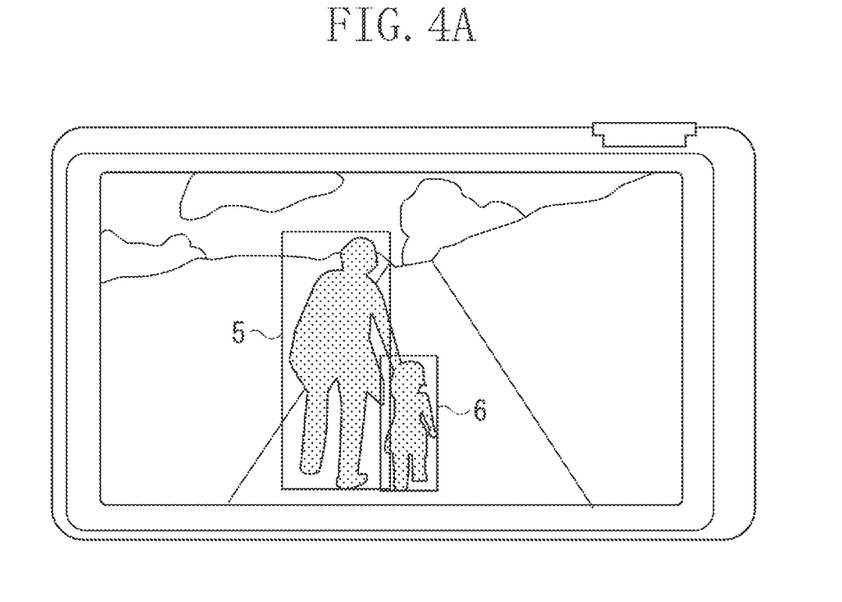
FIGS. 4A and 4B illustrate a result of human body detection processing and scene recognition processing, respectively.

FIG. 4A illustrates how the human body is detected in this processing. FIG. 4A illustrates a region 5 in which a person 2 is detected and a region 6 in which a child 3 is detected.

In step S4 (scenery recognition step), the recognition unit 103 performs recognition as to what is captured in the image as the scenery recognition processing. A method discussed in, for example, Non-Patent Document 4 (Objects in Context, Proceedings of the 2007 IEEE International Conference on Computer Vision, 2007) may be utilized as the method for performing the recognition.

More specifically, a region in the image is divided according to a Normalized Cut Method, and subsequently, to what the divided regions are classified is determined for each divided region according to a Bag of Features Method. In the light of a positional relationship between regions, the classification determination result is corrected so that the region is reclassified into classification with a statistically higher possibility. With the above described processing, such an error can be decreased that, for example, a blue region of an upper section of a screen is determined as not the sky but the sea.

Figure 4B:
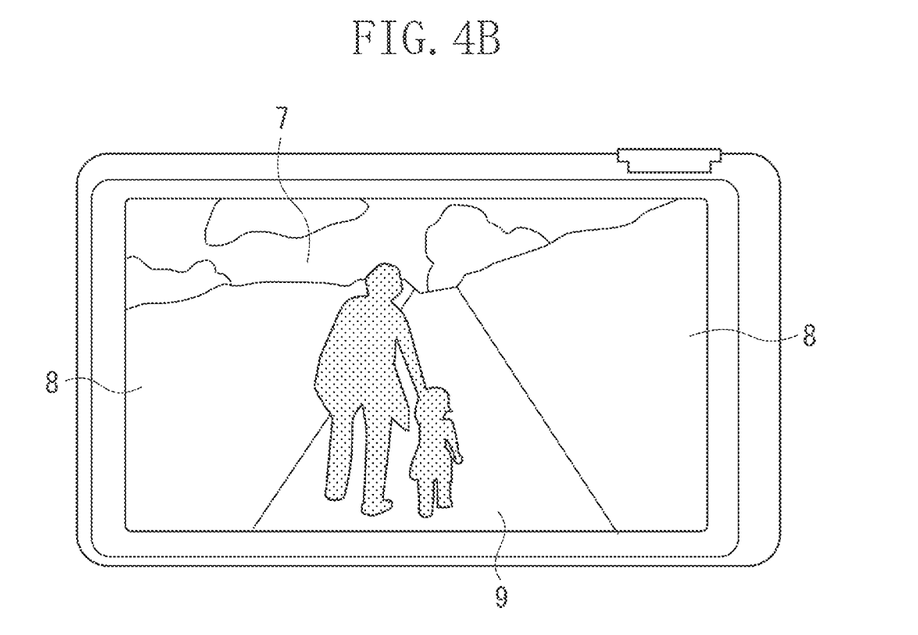

FIG. 4B illustrates a result of the scenery recognition performed in such a manner as described above. FIG. 4B illustrates an example of an image including a region which is determined as the sky 7, a region which is determined as the grass land 8, and a region determined as the road 9.

In step S5 (character recognition step), optical character recognition (OCR) processing as character recognition processing is performed with respect to a captured image and one or more characters are detected and recognized.

In step S6 (display priority determination step), the display priority determination unit 107 determines on which region in the image a menu is to be displayed as the display priority determination processing.

In steps S2 through S5, target objects in the image are recognized, however, if menus are displayed on all the recognized objects in the image, too many menus are displayed in the screen which may cause the user confused. Therefore, to which target object a menu is to be displayed is determined in the processing.

Calculation of the display priority may be performed by any method. In the present exemplary embodiment, the display priority is determined for each recognized target object by the following equation.

$$D = k * f(x,y) * g(x,y)$$

where D represents a display priority to be calculated. k represents the importance of the recognized object in the display mode recorded in the recognized-object data base 104. Here, a value which differs according to the display mode is set as k.

Figure 5A:
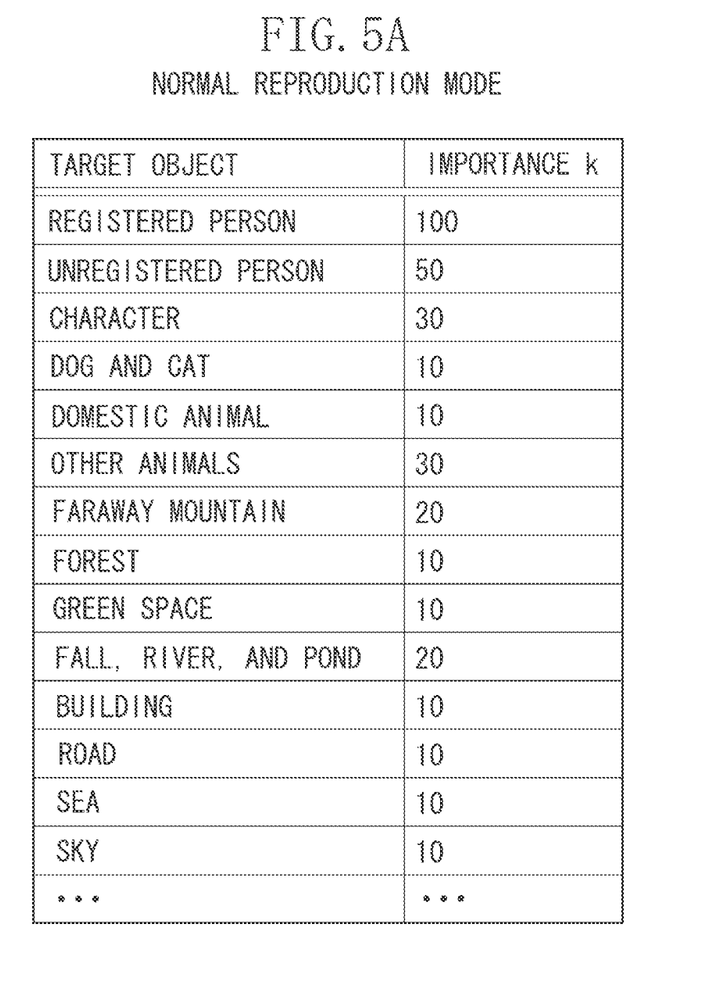
FIGS. 5A through 5C are examples of target object importance tables each illustrating a relationship between the target object and importance k in each of a "normal reproduction mode", a "scenery priority reproduction mode", and a "character priority reproduction mode", respectively.
Figure 5B:
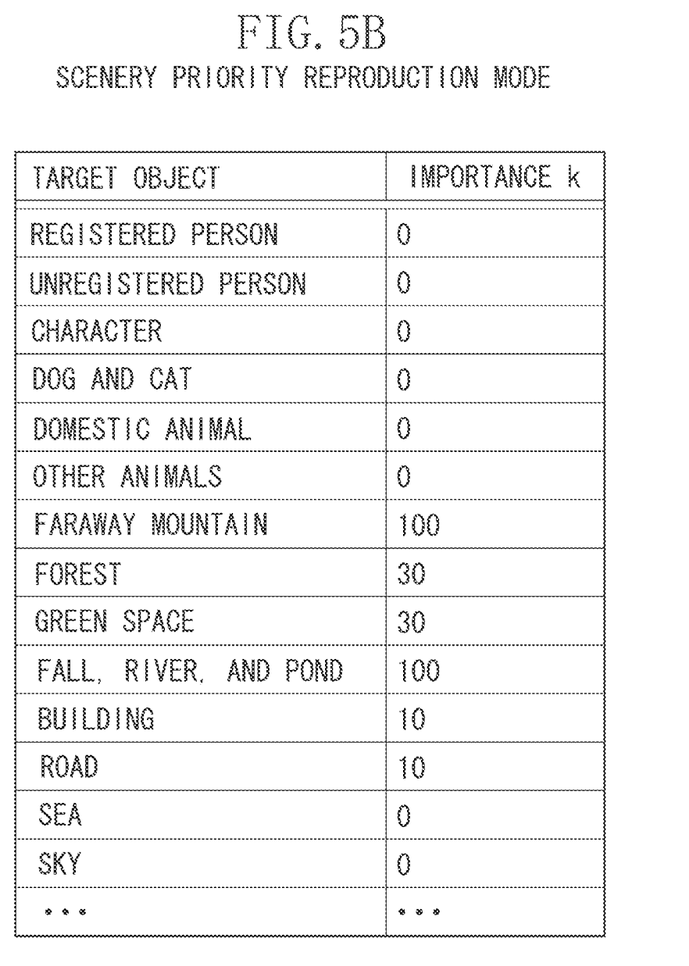
Figure 5C:
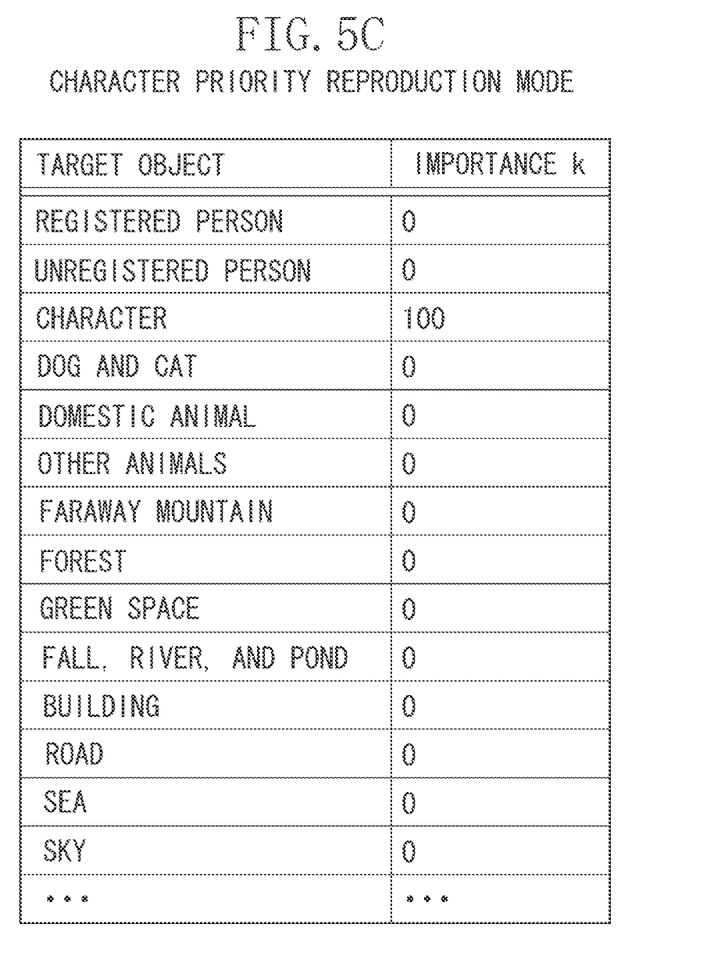

FIG. 5A is an example of a target object importance table illustrating a relationship between the target object and the importance k in the "normal reproduction mode" according to the present exemplary embodiment. FIG. 5B is an example of a target object importance table illustrating a relationship between the target object and the importance k in the "scenery priority reproduction mode" according to the present exemplary embodiment. FIG. 5C is an example of a target object importance table illustrating a relationship between the target object and the importance k in the "character priority reproduction mode" according to the present exemplary embodiment.

In this table, the importance k of the most important target object is set to 100, whereas the importance k of the least important target object is set to 0. As the target object of which importance k is set to a higher value, the menu thereof tends to be displayed. A menu is not displayed with respect to the target object of which importance k is set to 0.

Coordinates (x, y) represent a center of the recognized object of which display priority is to be calculated. The function f(x, y) takes the maximum value when the coordinates (x, y) are at the center of the captured image. As departing away from the center of the captured image, the function monotonically decreases. According to the function, what is positioned at a center of the captured image, i.e., what is placed at a center of the captured image by a photographer, can be calculated with a higher display priority.

The function g(x, y) takes the maximum value when the coordinates (x, y) are set in a lower section of the captured image, and as departing away therefrom, the function monotonically decreases. With the function, an object in the lower section of the captured image, i.e., an object positioned nearer to the photographer, can be calculated with a higher display priority.

With the above described functions, the display priority is calculated for all the respective target objects recognized in the captured image and the target objects which satisfy a predetermined standard, i.e., top three of the target objects having the higher display priorities in the image, are provided with menus overlapped on the target objects. In a case where display contents are duplicated among the three target objects, the objects are excluded. The menu of the target object having the display priority of "0" is not displayed.

In step S7 (display step), the captured image and the menus provided over the captured image are displayed. In other words, the menus only for the target objects which are determined as satisfying the predetermined standard in step S6 and a menu suitable for each of the recognized objects are displayed. How the menus are displayed in each display mode is described below with reference to the drawings.

Figure 6A:
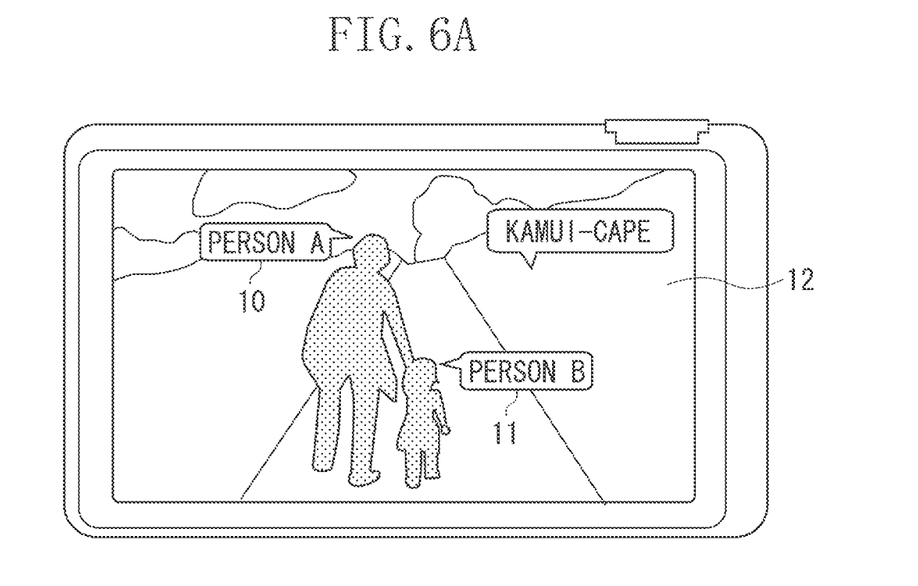
FIGS. 6A and 6B illustrate an image to be displayed in each of the normal reproduction mode and the scenery priority reproduction mode.

FIG. 6A illustrates an image displayed in the normal reproduction mode. In FIG. 6A, menus are displayed for the person 2, the child 3, and the grass land 8 which have the higher display priorities.

The image-captured person 2 is recognized as a person in steps S2 and S3, however, since the recognized face is not registered in the recognized-object data base 104, a menu for unknown person 10 is displayed.

The image-captured child 3 is also recognized as a person in steps S2 and S3, however, since the recognized face is not registered in the recognized-object data base 104, a menu for unknown person 11 is displayed.

A menu for a land form 12 is displayed on the grass land 8. When the menu for the land form 12 is displayed, the control unit 106 acquires a map around the image-captured region from a map data base stored in the recognized-object data base 104 based on location information acquired from a location information acquiring unit 109. The control unit 106 acquires place name information corresponding to the grass land 8 in the acquired map to display the place name in the menu of the land form 12.

Figure 6B:
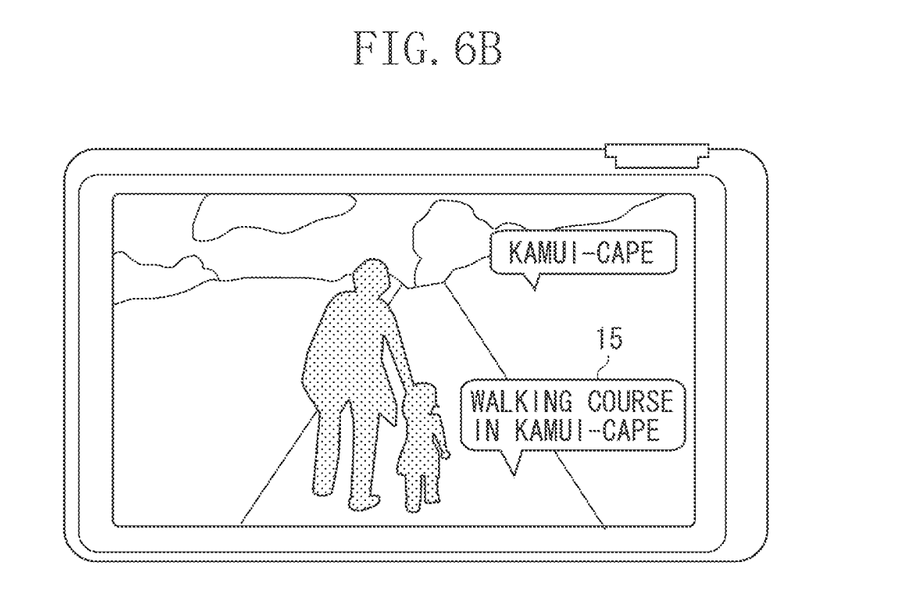

FIG. 6B illustrates an image displayed in the scenery priority reproduction mode in the processing. In FIG. 6B, a menu for a road 15 is displayed in addition to the menu for the land form 12. In FIG. 6B, since only the grass land 8 and the road 9 are the target objects of which display priorities indicate a positive value within the screen, menus are displayed only with respect to the two target objects.

Figure 7:
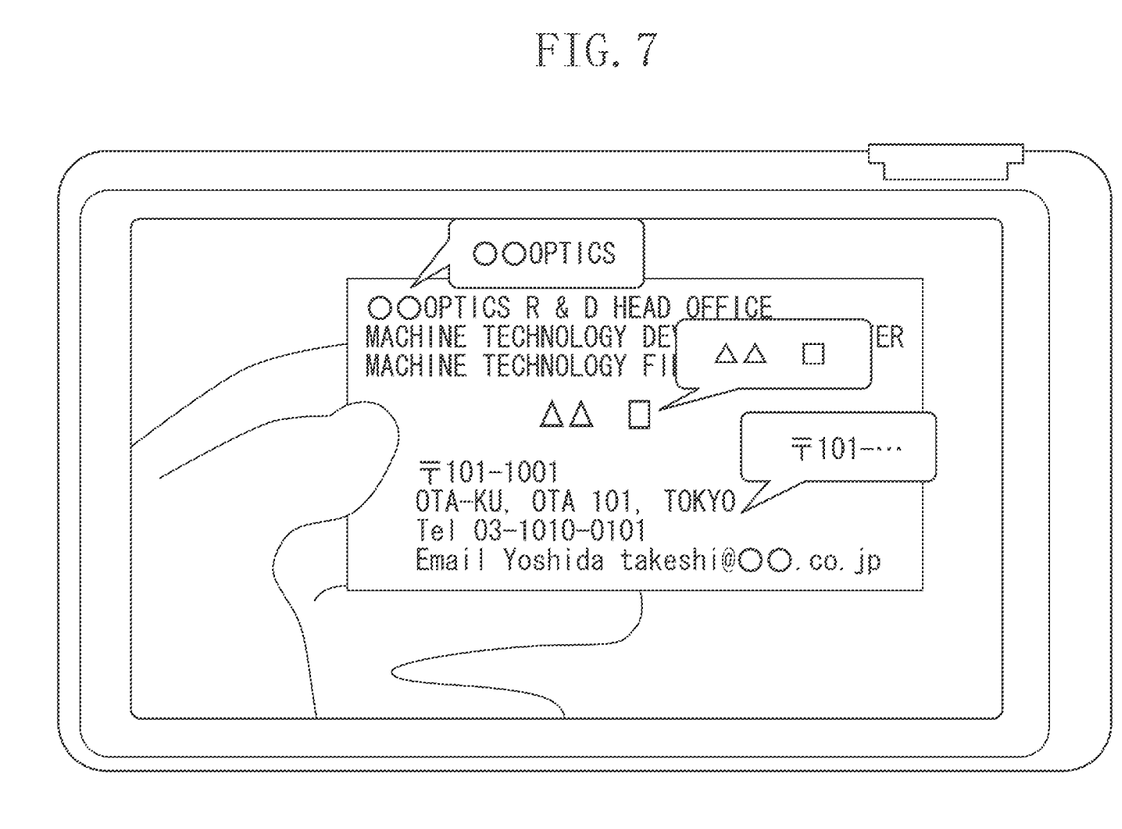
FIG. 7 illustrates an example of menus displayed corresponding to recognized characters.

In the character priority reproduction mode, in a case where characters are captured in the screen, e.g., in a case where an image of a name card is captured, a menu for the recognized characters is displayed as illustrated in FIG. 7.

The user can touch the displayed menus, thereby causing submenus in a lower layer of the menu to be displayed. As a matter of course, in a case where the user does not desire to display the submenus, the user may use the menus as labels for displaying, for example, a name of the recognized person and a title of the place name.

Figure 8:
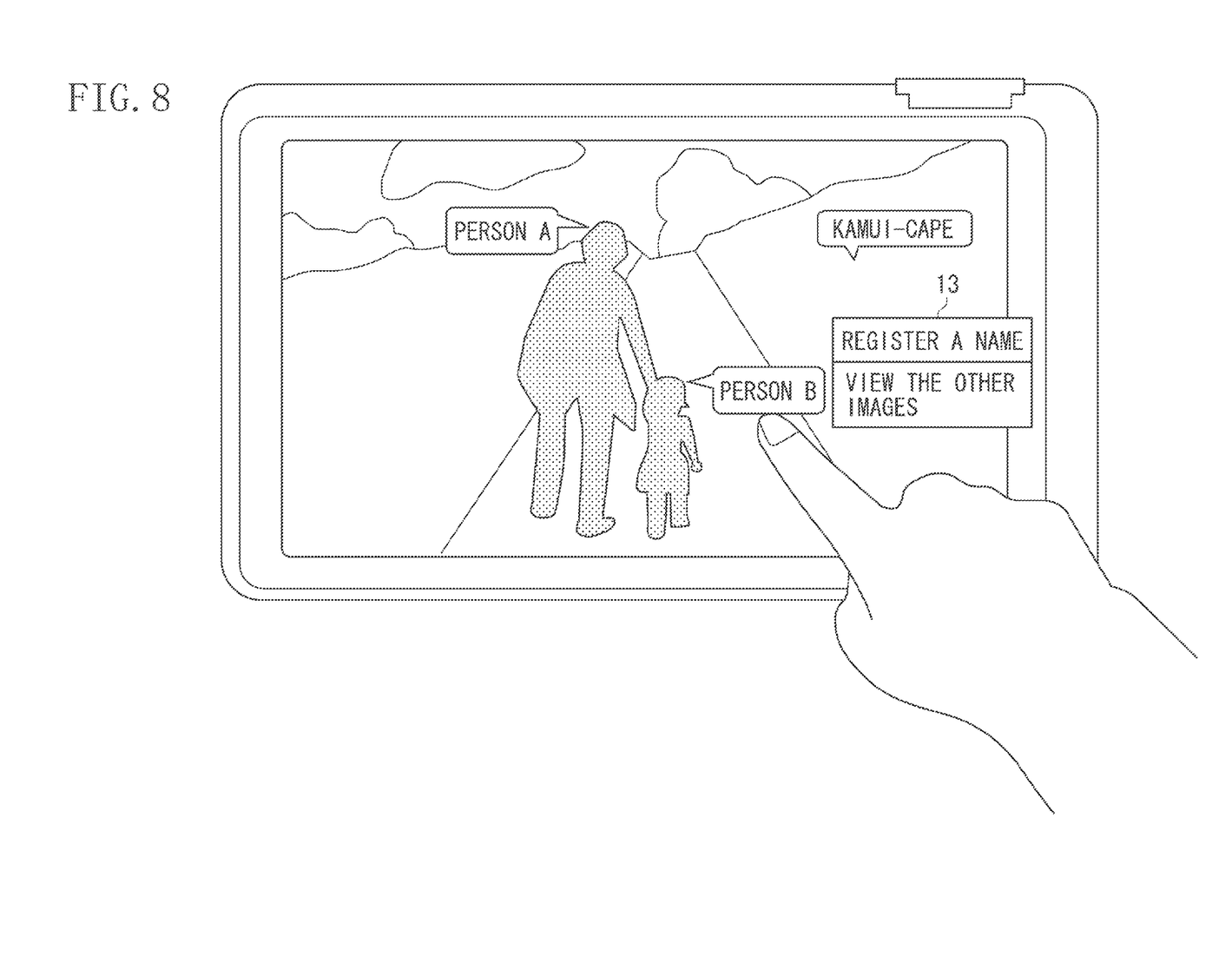
FIG. 8 illustrates a submenu to be displayed when a user touches an unknown person menu displayed relating to a child 3.

FIG. 8 illustrates a submenu 13 displayed when the user touches the menu for unknown person 11 displayed with respect to the child 3. When the user selects a "register a name" from the submenu, the user can register a name and features of the child 3 in the recognized-object data base 104.

When the user selects "view the other images" from the submenu, the user can view a list of the other images, which are stored in the compact digital camera, including the person having features of the child 3. In the present exemplary embodiment, the user can display the submenus by touching the menus. As a matter of course, it is not necessary for the user to actually touch the menus but any other method can be employed as far as the user can operate the menus.

Contents of the submenus displayed when the user touches the menus vary according to the target objects.

Figure 9:
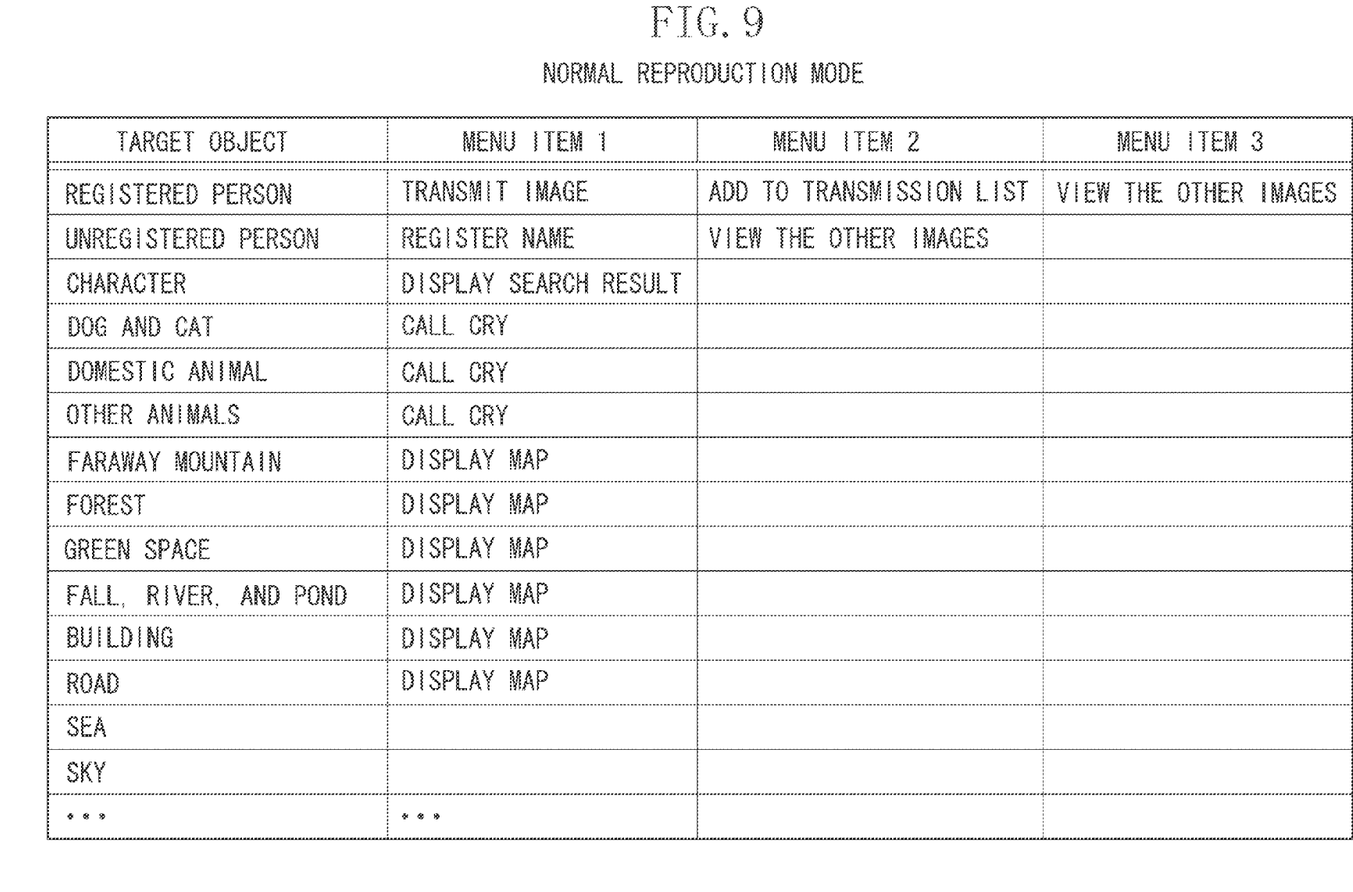
FIG. 9 illustrates an example of a target object related submenu table used in determining which submenu is to be displayed for a target object.

FIG. 9 illustrates an example of a target object-related submenu table to be used in determining which submenu is to be displayed according to the target object. The table is stored in the recognized-object data base 104.

In this processing, the control unit 106 refers to the target object-related submenu table stored in the recognized-object data base 104 to determine the submenu to be displayed. More specifically, one or more submenus corresponding to the target object which the user has touched and thus the menus thereof are displayed around a point where the user touched.

In the processing, when the user touches a region where no menu is displayed, e.g., the road 9, a menu corresponding to the target object in the region is displayed regardless of the display priority of the region.

In the processing, when the control unit 106 determines which point the user has touched, information of the region recognized in the recognition processing executed in steps S2 through S5 are referred to. In other words, in a case where the user touches the region where the control unit 106 recognizes as including the target object, the control unit 106 determines that the user touches the region.

The region within the screen may be duplicately determined in steps S2 through S5. For example, the region of the face of the person 2 is determined as a face region in step S2 as well as determined as a human body region in step S3, respectively. As described above, in a case where the user touches the region which is duplicately recognized in the recognition processing performed in steps S2 through S5, the region recognized in the earlier recognition processing is determined in priority. In other words, in a case where the user touches the face region of the person 2, a menu corresponding to the face is displayed.

As described above, to which target object the menu is displayed is determined by a display priority calculated by using the target object importance table illustrated in FIG. 5. However, the display priority may be calculated according to a method different from the above method.

In the present exemplary embodiment, a submenu identical to that illustrated in FIG. 9 is displayed for the same target object in all the display modes. However, it is not limited to this, and a different target object-related submenu table may be prepared for each display mode to display a different submenu according to each display mode.

In the present exemplary embodiment, the menu is displayed according to the same processing as illustrated in FIG. 3 in all of the display modes. However, it is not limited thereto, and the recognition may be performed by different processing according to the display modes. For example, the imaging apparatus may be configured in such a manner that the imaging apparatus performs the facial recognition, the human body recognition, the scenery recognition, and the character recognition in the image capturing mode, whereas the imaging apparatus does not perform the facial recognition and the human body recognition in the scenery priority reproduction mode. More specifically, the imaging apparatus may be configured so that an object to be recognized is controlled according to the display mode (or, an object to be recognized is changed).

In the first exemplary embodiment, the "normal reproduction mode", the "scenery priority reproduction mode", and the "character priority reproduction mode" are set by means of the mode setting dial. However, it is not limited thereto, and the display mode during the reproduction of the captured images may be determined according to a different method.

In a second exemplary embodiment, the imaging apparatus in which the display mode is automatically determined is described below. The imaging apparatus according to the present exemplary embodiment is, as similar to the case of the first exemplary embodiment, a compact digital camera which can display a captured image. The imaging apparatus according to the present exemplary embodiment can recognize a captured subject by image recognition and can combine a suitable menu with the captured subject to display it when displaying a captured image.

The imaging apparatus according to the present exemplary embodiment has a configuration almost identical to that of the first exemplary embodiment as illustrated in FIG. 1 except for the mode setting unit 108, i.e., the imaging apparatus according to the present exemplary embodiment has only two operation modes such as an "image capturing mode" and a "reproduction mode".

The imaging apparatus according to the present exemplary embodiment performs control processing almost identical to the control processing according to the first exemplary embodiment illustrated in FIG. 3 except for how to determine the display mode. In the present exemplary embodiment, after the character recognition step S5, both information output from the location information acquiring unit 109 and information output from the recognition unit 103 are used to automatically determine the display mode.

Figure 10:
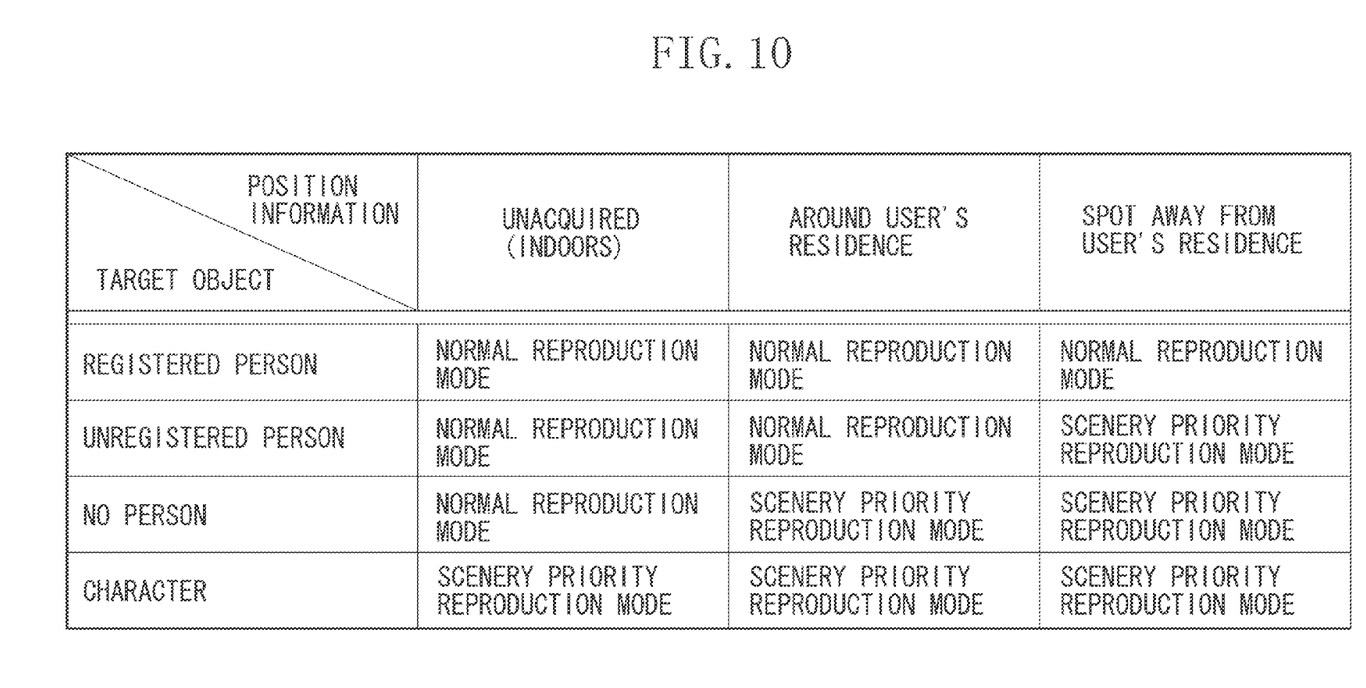
FIG. 10 illustrates an example of a display mode determination table.

The determination of the display mode is performed according to a display mode determination table illustrated in FIG. 10. The target object is determined based on the information output from the recognition unit 103. In a case where the registered person is confirmed in the image, a row of the table indicating "registered person" is selected.

In a case where a registered person is not confirmed in the image but a person is detected in the image, a row of the table indicating "unregistered person" is selected. In a case where a person is not detected but characters are detected, a row of the table indicating "character" is selected. In a case other than the above, a row of the table indicating "no person" is selected.

Determination of location information is performed according to the information output from the location information acquiring unit 109. In a case where no location information is acquired from the GPS, i.e., in a case where it is assumed that a photographer is in a building, a row indicating "unacquired" of the display mode determination table is selected.

In a case where the location information can be acquired and a point indicated by the information exists within a range of 50 km of the user's residence preliminary registered by the user, a row of the table indicating "around user's residence" is selected. On the other hand, in a case where the location information can be acquired and the information indicates that the position is away from the preliminary registered user's residence by a distance more than 50 km, a row of the table indicating "location away from user's residence" is selected.

As described above, a row and a line of the display mode determination table is selected to determine either one of the display modes, i.e., either one of the "normal reproduction mode", the "scenery priority reproduction mode", or the "character priority reproduction mode", displayed in a cell at which the row and the line cross to each other as the display mode. The display mode determination table may be stored in the recognized-object data base 104 or may be stored in the recording unit 102.

As described above, the determination method for automatically determine a display mode according to the present exemplary embodiment is described below. With the above described method, in a case where the registered person is captured in an image, a menu relating to the person is automatically displayed on a screen in priority.

In a case where a user goes to a tourist spot away from his residence, a menu relating to the spot is automatically displayed on the screen in priority ignoring the other people who are strangers just accidentally in the spot. In a case where an image of a name card or the like is captured, a menu relating to the characters on the name card can be automatically displayed in priority.

In the present exemplary embodiment, only three types of modes are used as the display modes, i.e., the "normal reproduction mode", the "scenery priority reproduction mode", and the "character priority reproduction mode". However, it is not limited thereto, and the other display mode may be held in the present exemplary embodiment. For example, in a case where preliminarily registered scenery and a landmark are recognized in relation with the tourist spot in the image the user captured in the tourist spot, the mode may be automatically switched to a tourist spot mode.

In a case where many faces (i.e., more than a predetermined number of faces) oriented to the front are captured in the image, the mode may be switched to a commemorative image capturing mode. Alternatively, the display mode may be automatically set by using many pieces of information, e.g., location information, a target object, and captured images stored before and after the currently displayed image.

In the present exemplary embodiment, menus are superimposed on the image when reproducing and displaying the captured image. However, the menus may be displayed on a moving image during image capturing, in addition to on the image having been captured, in a similar manner.

In the present exemplary embodiment, menus which the user can operate by touching thereof are displayed on the recognized target objects. However, the menus may not be operable by the user but just a name of the object may be displayed on the image.

An image display apparatus according to a third exemplary embodiment is a digital photo frame which displays an image input from the external device. In a case where an image is displayed, the image display apparatus according to the present exemplary embodiment can recognize a captured subject according to image recognition processing and combine a suitable menu with the captured subject to display the resulting photographic subject.

The image display apparatus according to the present exemplary embodiment has almost the same configuration as the imaging apparatus in the first exemplary embodiment. The image forming apparatus according to the present exemplary embodiment has such a configuration that the imaging unit 101 and the location information acquiring unit 109 are removed from the configuration illustrated in FIG. 1 but an image input unit is added to the configuration illustrated in FIG. 1.

In the present exemplary embodiment, the image input unit includes an external medium insertion slot into which a medium is inserted and thus image data is taken into therefrom to store thus taken image data in the recording unit 102 via the control unit 106.

The image input unit may be any medium as far as the medium can take image data from the outside of the image display apparatus. For example, the image input unit may be a wireless receiver for receiving image data wirelessly via a wide area communication network.

The image display apparatus according to the present exemplary embodiment performs an image display in a manner similar to that performed in the imaging apparatus according to the first exemplary embodiment.

The image display apparatus according to the present exemplary embodiment performs the operation similar to that of the imaging apparatus of the first exemplary embodiment, so that, when displaying the image taken from the outside, the image display apparatus according to the present exemplary embodiment can display a menu suitable for the object in the image. Also, the image display apparatus according to the present exemplar embodiment can display menus on the objects having higher priority according to the display mode in a case where a lot of objects are captured in the image. The image display apparatus according to the present exemplary embodiment can display menus containing suitable contents according to the display mode.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-008288 filed Jan. 18, 2012, which is hereby incorporated by reference herein in its entirety.

What is claimed is:

1. An image display apparatus comprising:
a recognition unit configured to recognize at least one object from an image;
a calculation unit configured to calculate a display priority of the recognized at least one object based on a set display mode, a coordinate position of the center of the object with respect to the center of the image, and a coordinate position of the center of the object with respect to a lower end of the image;
a determination unit configured to determine an object for which information is to be displayed out of the recognized at least one object according to the calculated display priority; and
a display unit configured to display information of the object determined by the determination unit.

2. The image display apparatus according to claim 1, further comprising
a mode setting unit configured to set a display mode according to a user operation,
wherein the determination unit determines the object for which information is to be displayed based on the display mode set by the mode setting unit and a position of the object in the image.

3. The image display apparatus according to claim 1, further comprising:
a location information acquisition unit configured to acquire location information relating to a location where an image is captured; and
a mode setting unit configured to set a display mode based on the location information acquired by the location information acquisition unit and the at least one object recognized by the recognition unit,
wherein the determination unit determines the object for which information is displayed based on the display mode set by the mode setting unit and a position of the object in the image.

4. The image display apparatus according to claim 1, wherein the recognition unit changes an object recognized in a displayed image according to the display mode.

5. The image display apparatus according to claim 1, wherein a content of the information displayed on the display unit is changed according to the display mode.

6. The image display apparatus according to claim 1, wherein the information is a information of the object.

7. The image display apparatus according to claim 1, wherein the information of the object is a menu operable by a user, and the display unit displays a submenu existing in a lower layer of the menu in a case where the user operates the menu.

8. An image display method, comprising:
recognizing at least one object from an image;
calculating a display priority of the recognized at least one object based on a set display mode, a coordinate position of the center of the object with respect to the center of the image, and a coordinate position of the center of the object with respect to a lower end of the image;
determining an object for which information is displayed out of the recognized at least one object based on the calculated display priority; and
displaying information to the determined object.

9. A non-transitory computer readable storage medium configured to store a program for causing a computer to execute the image display method according to claim 8.

10. The image display apparatus according to claim 1, wherein the determination unit determines the object for which information is displayed, based on importance determined for each of display modes with respect to the object and a position of the object in the image.

11. The display apparatus according to claim 7, wherein a content of the submenu is different depending on the set display mode, even though the submenu is displayed for a same object.

12. The image display apparatus according to claim 1, wherein the determination unit is configured to determine a predetermined number of objects having higher display priorities out of objects having display priorities larger than a predetermined value as an object of which information is to be displayed.

13. The image display apparatus according to claim 1, wherein the information of the object is a menu operable by a user.

14. An image display apparatus comprising:
a recognition unit configured to recognize at least one object from an image;
a calculation unit configured to calculate a display priority of the recognized at least one object based on a set display mode and a position of the object in the image;
a determination unit configured to determine an object for which information is to be displayed out of the recognized at least one object according to the calculated display priority; and
a display unit configured to display information of the object determined by the determination unit.

* * * * *